June 9, 1953   R. G. KRESS   2,641,022
METHOD OF MANUFACTURING PLASTIC FILM
Filed Feb. 21, 1950   3 Sheets-Sheet 1

INVENTOR.
RICHARD G. KRESS
BY
ATTORNEY

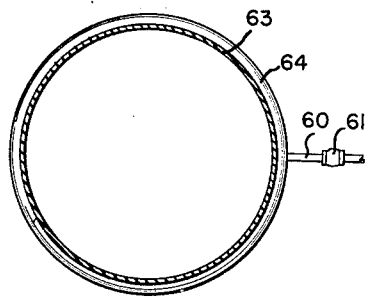
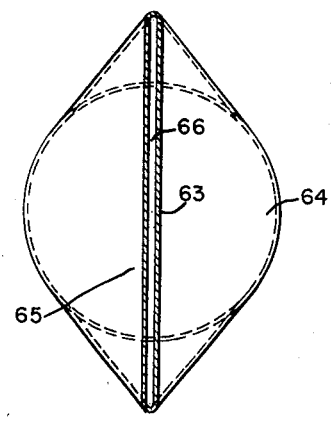
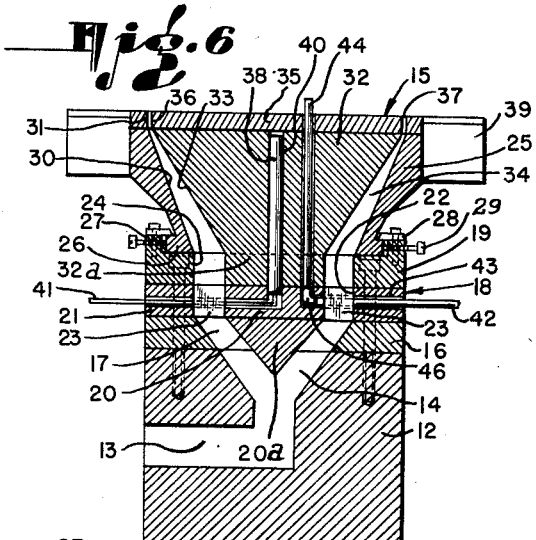
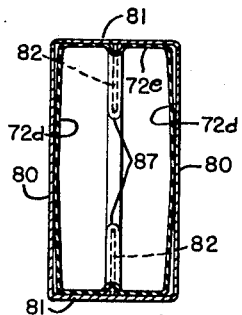
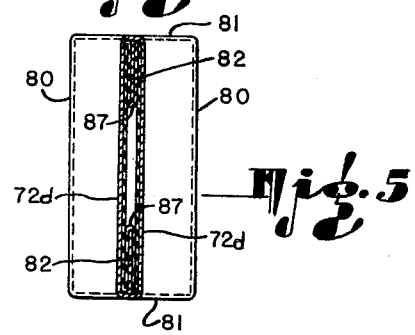
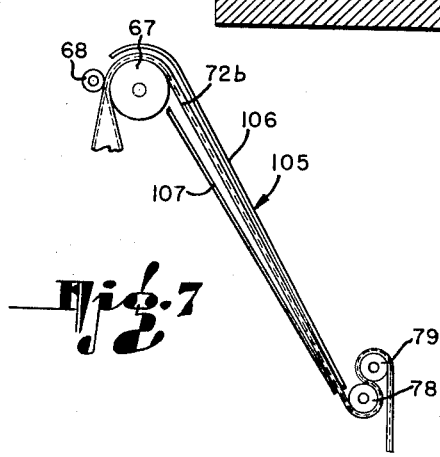

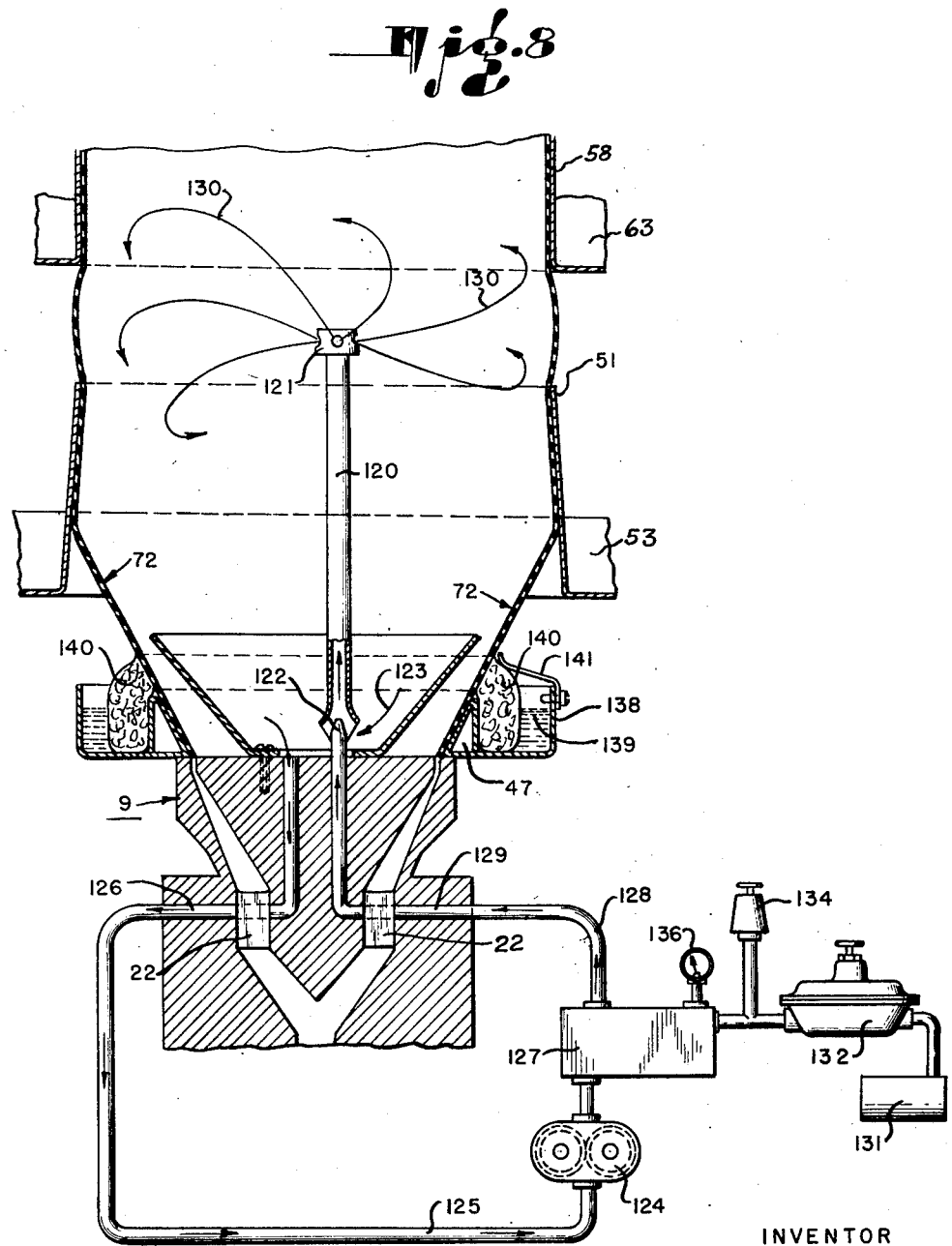

Patented June 9, 1953

2,641,022

UNITED STATES PATENT OFFICE 2,641,022

METHOD OF MANUFACTURING PLASTIC FILM

Richard G. Kress, Los Angeles, Calif., assignor to Extruders, Inc., Culver City, Calif., a corporation of California Application February 21, 1950, Serial No. 145,487

9 Claims. (Cl. 18—47.5)

My invention relates to the art of making a sheet, of tubular or flat form from thermoplastic material, and relates in particular to an improved method for manufacturing from thermoplastic materials film, foil sheet or thin-walled tubing.

It is an object of the invention to improve the quality of relatively thin walls which are made from thermoplastic materials, to reduce the cost of manufacture, increase the rate of production of and simplify the equipment required for a product of higher quality than is ordinarily obtained from accepted manufacturing procedures.

It is an object of the invention to provide an extrusion method for producing from thermoplastic material, a thin wall such as a film, foil, sheet or tube, having high tensile strength and resistance to tearing, in longitudinal and transverse directions, to increase the transparency of and to consistently maintain thickness of the wall within tolerances of plus or minus .00025 in. as compared to tolerances of a minimum of plus or minus .0005 in. obtainable in extrusion processes previously known to me.

It is an object of the invention to provide a method wherein the thermoplastic material is shock-cooled at a specified point in the manufacturing procedure and is drawn both longitudinally and transversely related to the shock-cooling of the thermoplastic material forming the wall.

It is an object of the invention to provide a method wherein the molten plastic material, extruded in the form of a thin wall, is brought into engagement with a cooled wall surface which causes a rapid reduction in temperature of the material and effects a change in the molecular structure of the material from amorphous toward crystalline state, and wherein the wall is stretched longitudinally and transversely so as to produce orientation of the molecules in these two directions, after which the material comprising the wall is shock cooled and reduced to room temperature.

A further object of the invention is to provide a method wherein the molten plastic material is extruded as a tube which is expanded circumferentially by application of fluid pressure within the tube to a selected diameter, after which the tube is shock cooled and reduced in diameter while maintained under longitudinal tension.

Another object of the invention is to provide a plastic film of exceptionally good clarity and physical properties which is obtained by simultaneously and/or sequentially shock cooling, expanding and drawing, the molecules of the film being thus oriented in two directions while at the same time being changed from amorphous to crystalline state.

Another object of the invention is to provide a method wherein a tube of plastic material is issued from a die at a rate of movement, is expanded diametrically by internal fluid pressure, and, at a location spaced from the die is moved forwardly at a rate greater than the rate of movement of the tube where it leaves the die, the tube being subjected to rapid cooling action at locations along its path of movement.

A further object of the invention is to provide a method such as defined in the foregoing paragraph wherein the tube of plastic material, after it is expanded, is brought into engagement with a cooled annular wall which cools the tube, limits its expansion and therefore controls the diameter of the tube.

A further object of the invention is to provide a method such as defined in the foregoing, wherein the tube of plastic material, after it is expanded, is brought into engagement with the inner surface of a forwardly converging tubular wall, which cools the wall of the tube, limits its expansion and then by circumferential contraction relieves the plastic wall of the tube from tension in transverse or circumferential direction, while the tube is moved forwardly and further cooled toward room temperature.

It is a further object of the invention to provide a method wherein a cooling medium is applied to the hot extruded plastic wall immediately after it has left the extruding die prior to the time when any great amount of stretching of the wall has taken place and during the time when initial stretching of the wall occurs.

A further object of the invention is to provide a method wherein a substance or substances are applied to either or both the inner and outer surfaces of the film or thin wall of plastic. Where plastics of tacky character are used in the practice of the invention, I provide a method and means for applying to the inner surface of the plastic tube a substance which will prevent sticking of one portion of the plastic wall to another when the tube is flattened. As a further example, the invention provides a method and apparatus whereby a substance having lubricating qualities is applied to the external surface of the tube, so that the tube will slide more readily through a tubular stack part of the equipment. If the plastic employed in the practice of the invention is of a type which is hardened by chemical reaction with an applied substance, my method includes application of such substance to the tube in the manner hereinafter pointed out.

Herein the term "plastic" is used to designate all materials suited for use in my new method and apparatus, having the quality of being at one stage of the process readily deformable and flowable in response to application of force and at another stage of the process being comparably inelastic and resisting deformation to a degree making the materials suitable for the specified services which they are to render. Among these plastics are included thermoplastic materials such as cellulose acetate, cellulose acetate butyrate, methylmethacrylate, polyethylene, polyvinylidene chloride (plasticized and unplasticized), polyvinyl chloride (plasticized and unplasticized), polyvinyl chloride vinyl acetate (plasticized and unplasticized), polystyrene, acrylonitrile vinyl, polyisobutylene polyethylene, copolymers of isobutylene and styrene, tetrafluoroethylene, polyamide, blends of rubber, synthetic and natural, with vinyl or polyisobutylene-styrene or vinyl, cellulose acetate propionate, polyvinyl alcohol, and ethyl cellulose.

Further objects and advantages of the invention will be brought out in the following part of the specification wherein I have described a specific embodiment of the invention in detail for the purpose of making a complete disclosure without limiting the scope of the invention set forth in the appended claims.

Referring to the drawings which are for illustrative purposes only:

Fig. 2 is a sectional view taken as indicated by the line 2—2 of Fig. 1.

Fig. 3 is a sectional view taken as indicated by the line 3—3 of Fig. 1.

Fig. 4 is a sectional view taken as indicated by the line 4—4 of Fig. 1.

Fig. 5 is a sectional view taken as indicated by the line 5—5 of Fig. 1.

Fig. 6 is an enlarged fragmentary section of the die which forms part of the invention.

Fig. 7 is a fragmentary schematic view showing means for forming a flat tube from the plastic tube.

Fig. 8 is a schematic view showing that part of my invention pertaining to application of coating substances to the surfaces of the extruded wall of plastic material.

Figure 1:
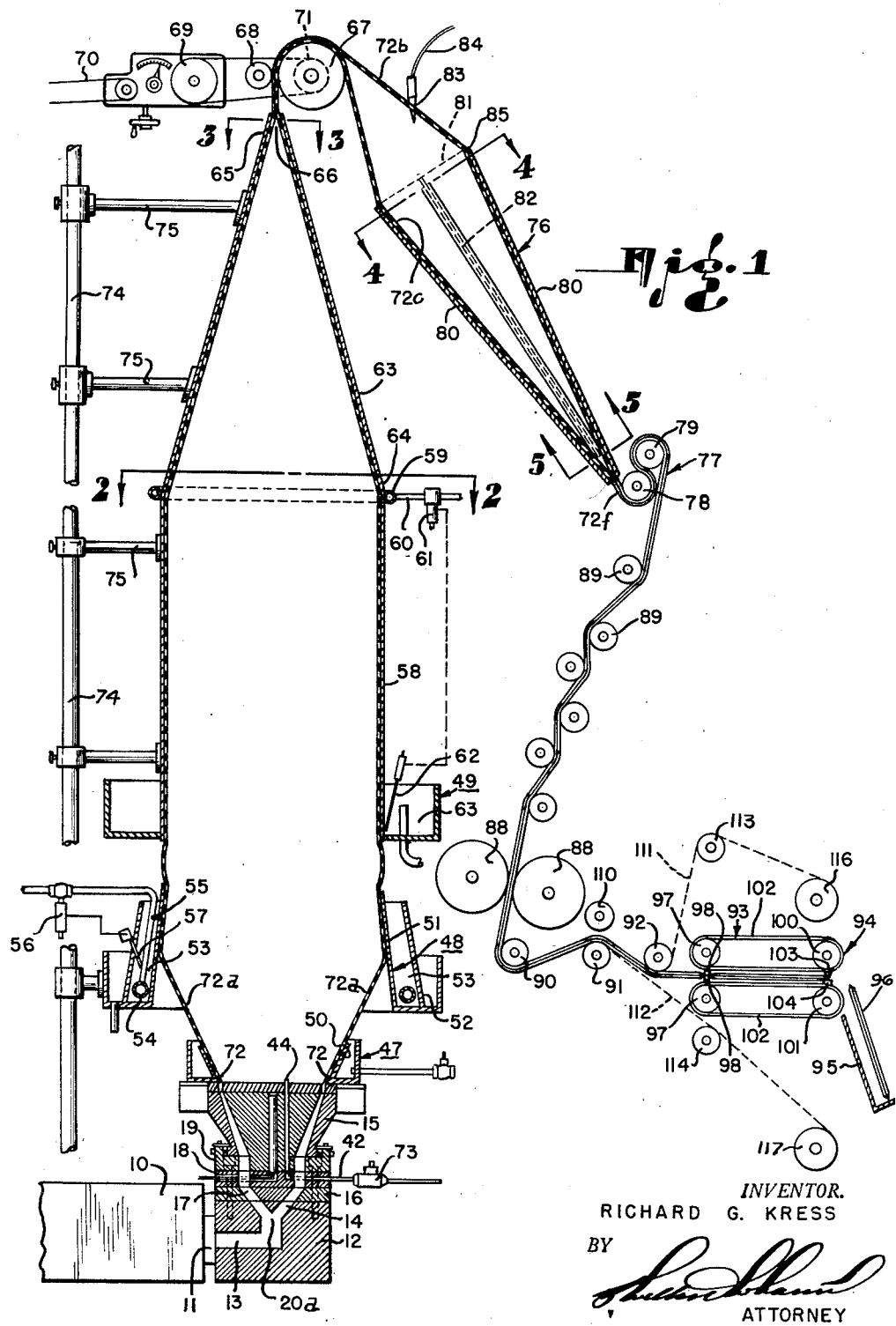
Fig. 1 is a schematic, partly sectioned view showing a preferred form of apparatus forming a part of the invention and by which my preferred method may be practised.

In the device shown in Fig. 1, I employ an extrusion screw machine 10 of conventional type having an outlet 11 to which a 90° elbow fitting 12 is attached, this fitting 12 having a passage 13 which receives molten thermoplastic material from the screw machine 10 under pressure and at a substantially continuous rate of flow. The passage 13 has an expanded outlet 14 facing vertically upwardly. As shown in Figs. 1 and 6, an extrusion die 15 is connected to the fitting 12. Between the die 15 and the fitting 12 there is a ring 16 having a flaring opening 17, a spider 18 and a ring 19. The spider 18 comprises a central annular wall portion 20, a ring portion 21, and spaced radial wall portions or spokes 22 which lie between spaced spider openings 23 adapted to connect the opening 17 of the ring 16 with the opening 24 of the ring 19.

The die 15 includes the shell 25 consisting of an annular wall with a flange 26 at its lower end arranged to fit within a lip 27 which projects upwardly from a marginal portion of the ring 19. Hold-down clamps 28 engage the upper face of the flange 26, and at least three radial screws 29 are threaded through the lip 27 to engage the flange 26 for the purpose of radially adjusting the shell 25.

The shell 25 has an upwardly flaring inner surface 30 and at the upper end of the surface 30 there is a cylindric, inwardly presented surface 31. The die 15 further includes a die body 32 which is received within the opening of the shell 25 and has an outer conical surface 33 confronting the surface 30 and diverging downwardly with relation to the surface 30 so as to produce between the shell 25 and the body 32 an annular passage 34 which increases in cross-sectional area or enlarges downwardly, as shown. At the upper end of the body 32, there is a circular plate 35 having a cylindrical circumferential face 36 confronting the inwardly presented circumferential face 31 and being spaced therefrom so as to provide a cylindric extrusion orifice 37. Change in the cross-sectional area of the orifice 37 is accomplished by replacing the circular plate 35 with another circular plate of required diameter. So as to maintain or regulate the heat of the molten plastic material received from the screw machine 10 electrical heaters 38 and 39 are provided for the die 15. The heater 38, of slender form, is disposed in an axial opening 40 in the die body 32. The heat producing or activating medium for the heater 38, namely electric current, is carried to the heater 38 by conductor means 41 which passes through an opening in the outer ring portion 21, a radial wall portion 23 and the central wall portion of the ring 19. The heater 39, schematically shown in Fig. 6, is annular and fits snugly around the upper portion of the shell 25. The molten plastic, when it arrives in the space or passage 34, is brought into engagement with the heated walls of the shell 25 and the body 32. By the time the plastic reaches the orifice 37, the temperature around all portions thereof is substantially equalized and the rate of flow of molten plastic through all portions of the orifice 37 is constant, within very close limits, this condition contributing in part to the production of a superior plastic tube or sheet.

The die body 32 has at its lower end a cylindrical portion 32a which extends into the circular opening 24 of the ring 19 and defines therein an annular chamber of large cross-sectional area at the lower end of the upwardly and outwardly flaring annular passage 34. A conical body 20a is secured to the lower face of the central portion 20 of the spider 18 and projects downwardly into the opening 17 and the flared outlet portion 14 of the passage 13. An air tube 42 extends radially inward through an opening 43 in the spider, and its inner end is connected to the lower end of a tube 44 which projects from the upper face of the land plate 35 of the die body 32 down through the body 32 to an elbow passage 46 in the central wall 20 of the spider 18.

The space immediately adjacent the upper face of the die 15 comprises the first shock cooling zone and has therein the shock cooling ring 47. Above the shock cooling ring 47, a shock cooling member 48 identifies the second shock-cooling zone of the device, and above the member 48 a third shock cooling member 49 identifies the third shock cooling zone of the device. The first shock cooling member 47 comprises an annular hollow body or ring having a conical upwardly flaring wall 50 having at its lower end an internal diameter corresponding to the diameter of the wall surface 31, Fig. 6, of the die 15.

The second shock cooling member 48 comprises a conical wall 51 which converges upwardly. Other walls 52 cooperate with the wall 51 so as to form a chamber 53 adapted to receive a coolant such as cold water which is delivered to the bottom of the chamber 53 by a circular perforated distributing pipe 54 to which water is fed through piping 55 under control of a thermostatic valve 56 associated with thermometer 57 located in the chamber 53. The third shock cooling member 49 comprises a water chamber formed in part by the lower portion of a metal tube or stack 58 having an internal diameter substantially the same as the internal diameter of the upper end of the conical wall 51. The metal wall of the stack 58 is cylindrical and to the upper portion thereof a continuous flow of water is fed from outlet openings in an encircling water distributing ring 59, fed through piping 60 under control of a thermostatic valve 61 and associated thermometer 62 disposed in the water chamber 63 of the shock cooling member 49.

Immediately above the stack 58 there is a forming member or stack 63 a lower portion 64 of which is circular. The metal wall of the stack 63, above the lower end 64 is gradually flattened on opposite sides so that the upper end 65 of the stack 63 defines a narrow diametrically arranged mouth 66 as shown in Fig. 3. Above the mouth 66 there are cooperating large and small pinch-off rollers 67 and 68. Variable speed drive means 69 are provided for the roller 67, this drive means 69 being schematically indicated as a variable speed gear mechanism adapted to be driven through a chain 70 and adapted to drive the roller 67 through chain and racket means 71.

In accordance with conventional extrusion practice the screw machine 10 is heated and delivers the molten thermoplastic material continuously to the die 15, the result being that a tube 72, Fig. 1, of the thermoplastic material is discharged upwardly from the die orifice. This tube 72 extends up through the parts 47, 48, 49, 58 and 63 and in flattened form passes between the rollers 67 and 68 and travels over the top of the roller 67 to other equipment which will be hereinafter described. Under control of the pressure reducing valve 73, fluid under pressure, such as air, is delivered from a suitable source through the piping 42 and 44 into the interior of the tube 72, inflating and expanding this tube 72 so as to stretch its wall diametrically thereby increasing the diameter of the tube 72 and decreasing the thickness of its wall. This transverse stretching of the wall of the plastic tube 72 produces transverse molecular orientation. However the variable transmission 69 is adjusted so that the surface speed of the roller 67 will be greater than the surface speed of the wall of the tube 62 where it leaves the die orifice. Therefore, the tube is stretched, and subjected to molecular orientation, in longitudinal direction. In this way the wall of the tube 72 is given increased strength and resistance to tear in both transverse and longitudinal directions.

In addition to the foregoing, the quality of the product is very greatly increased by the shock cooling of the plastic walls of the tube 72 at prescribed locations along the path of travel of the tube during its formation. As the tube 72 leaves the orifice of the die 15, internal air pressure forces it out against the conical wall 50 of the cooling ring 47, causing a quick reduction in temperature of the wall of the tube 72 at this point, so that there is immediately initiated a conversion of the molecules of the plastic material from amorphous toward crystalline state. For example, if the thermoplastic material forming the tube 72 is polyethylene, the temperature of the material passing through the die 15 may be approximately 375° F. The shock cooling ring 47 is maintained at a temperature of around 210° F., with the result that the wall of the tube 72, immediately after being issued from the orifice of the die 15 is reduced to a temperature very close to the temperature of the cooling ring 47, namely 210° F., it is stretched transversely and longitudinally and at the same time is subjected to a first stage of shock cooling. As the wall of the tube 72 moves upwardly from the shock cooling ring 47, internal air pressure expands it as shown at 72a, so that the wall of the tube 72 in this expanded condition is brought into engagement with the internal surface of the tubular wall 51 wherein it is again shock cooled by direct contact with the cold wall 51 having a temperature of approximately 150° F. The wall 51 is reduced in diameter in the direction of movement of the wall of the tube 72. Therefore it constricts the tube above the horizontal line of engagement of the tube wall with the wall 51 and relieves the tube wall from transverse or circumferential tension. The taper of the wall 51, in the present practice of the invention is 1 in. to the ft., but may, under various circumstances be within the range of ¾–1½ in./ft.

The stretched wall of the tube 72 passes upwardly from the upper end of the tapered wall 51 into the lower end of the stack 58 wherein it is subjected to the action of the third shock cooling means 49 which "sets" the plastic after it has been subjected to limited stretching while moving vertically across the space between the upper end of the wall 51 and the lower end of the wall 58. By "set" is meant the reduction of the temperature and state of the plastic wall to a point where it is substantially relieved of elasticity and therefore will stretch only an insignificant amount after leaving the zone of the third shock cooling means 49. The wall of the tube is substantially completely cooled by the time it reaches the lower end of the flattening stack member 63. By use of the method and apparatus heretofore disclosed, a thin durable and transparent plastic wall is rapidly and economically formed. It is a feature of the present process to stretch the plastic wall to substantially equal extent in both transverse and longitudinal directions and to stretch the wall in both transverse and longitudinal directions with a coefficient of 5, that is to say the wall of the tube 72, after it issues from the annular orifice of the die 15, is stretched to 5 times its initial diameter and is stretched to 5 times its original length. Therefore, the area of the wall 72 issued from the die 15 is increased 25 fold. If the wall thickness of the tube 72 within the orifice of the die 15 is .03 in., the thickness of the tube wall issued from upper end of the stack or shell 63 will have a thickness of .0012 in. within a tolerance of plus or minus .00025 in.

The members 48, 49 and 63 are vertically adjustable with relation to each other and with relation to the die 15 and the first shock cooling means 47. A vertical structure schematically indicated at 74, has thereon slidable brackets 75 for supporting the forming-stack parts 49, 58, and the shock cooling member 48.

From the roller 67, the flattened tube is carried through gusset forming means 76 which is follower by means 77, referred to as pinch off rollers 78 and 79, for preventing escape of air from the interior of the tube during the gusset forming operation. As shown in Figs. 1, 4 and 5, the gusset forming means 76 has walls 80 which diverge from a point near the roller 78 toward the roller 67, and walls 81 which connect the edges of the walls 80 as shown, thereby cooperating with the walls 80 to form a hollow wedge-shaped tube, gusset folding members 82. Each of these gusset folding members 82 comprises a rib projecting inward from the center line of the wall 81 and gradually increasing in projection, from the front toward the rear end of the gusset forming means 76. Between the spaced sealing means represented by the rollers 67—68 and 78—79, the plastic tube is inflated. A hypodermic needle 83, attached to an air hose 84, is caused to puncture the wall 72b of the tube, to deliver into the interior thereof a body of air or "bubble." The separated or expanded walls of the tube pass into the gusset forming means 76. At the front end 85 of the gusset forming means 76, the tube, as indicated at 72c in Fig. 1, assumes substantially the rectangular cross sectional configuration defined by the front ends of the walls 80 and 81. The wall 72c, shown in Fig. 4, has wall portions 72d lying adjacent the walls 80 and wall portions 72e lying adjacent the walls 81. As the wall 72c travels forwardly (downwardly) from the front end 85 of the device 76, the rib members 82, of increasing projection, fold the central portions of the wall portions 72e inwardly, while convergence of the walls 80 move the wall portions 72d toward each other, thereby forming gussets 87 from the wall portions 72e, these gussets lying between wall portions 72d when the tube leaves the gusset forming device 76 as shown at 72f in Fig. 1. The tube passes under the rollers 78 and 79. It then passes downwardly to larger rollers 88, at least one of which is driven, and whereby pulling tension is applied to the gusseted tube. Between the rollers 79 and the rollers 88, the gusseted tube passes over rollers 89, some of which serve as guides another of which apply to the bag a flattening or smoothing effect.

From the rollers 88 the gusseted tube is carried across guide rollers 90, 91 and 92 to transverse sealing means 93 and then to rotary cut-off means 94 which cuts off the sealed lengths of the tube and to a chute 95 delivers flat gusseted bags 96, sealed at one end and open at the other.

The sealing means 93 comprises simultaneously rotating cylinders 97 having thereon projecting bars 98 which periodically engage opposite sides of the gusseted tube, pressing the plastic walls thereof together and sealing the same transversely of the tube. Then, as the tube travels forwardly, the cut-off means 94 acts to cut off the sealed section of the tube. This cut-off means 94 comprises cylinders 100 and 101 driven respectively by a chain and sprocket means 102 from rotating parts associated with the cylinders 97. The cylinder 100 carries a projecting knife blade 103, and the cylinder 101 carries a back-up bar 104 of metal softer than that of the knife blade 103.

The invention provides means for producing flat sheet from the plastic tube which issues from the upper end of the member 63, Fig. 1. The gusset forming means 76 is replaced by a tube smoother or flatter 105, such as shown in Fig. 7. This spreading and flattening means 105 comprises upper and lower plates 106 and 107 which are disposed on the opposite sides of the path of movement of the plastic tube 72b from the roller 67 to the roller 78, and which converge toward each other. The flattened tube, after passing over the roller 67 as indicated at 72b, is inflated between the plates 106 and 107, the air pressure within the tube portion 72b, spreading this tube laterally so that it will be smooth and flat when it leaves the lower ends of the plates 106 and 107 and passes under and around the roller 78. The flattened tube is passed over the roller 79 and across rollers 89 to the puller rollers 88. It then passes under the roller 90 and over the top of roller 91. Rotary cutter discs 110, one of which is shown in elevated position with relation to the roller 91 in Fig. 1, are lowered so as to cut off the edges of the flattened tube where it passes over the roller 91. This cutting operation severs the top and bottom portions of the flattened tube and they move onwardly through the apparatus as separate flat sheets indicated by dotted lines 111 and 112. These sheets pass over rollers 113 and 114 to suitable means of disposal, such, for example, as the rolls 116 and 117 on which the sheets 111 and 112 are wound.

In order to avoid complication in disclosure of the principal elements of the invention, I have in Fig. 8 separately shown that part of the invention pertaining to the application of substances to the surfaces of the plastic tube during the formation thereof. In Fig. 8, I schematically show the extrusion die 9 with the tubular plastic wall 72 extending upwardly therefrom and expanded into contact with the conical wall 51. Within the tube 72 there is a vertical pipe 120 having on the upper end thereof a spray head 121. An injection nozzle 122 extends into the lower end of the pipe 120, so that the action of an air jet from the nozzle 122 into the pipe 120 will produce a continuous circulation of air from the interior of the tube 72 and into the lower end of the pipe 120, as indicated by arrow 123.

The interior of the tube 72 forms a part of a closed circulation system including a pump 124 having its inlet connected by piping 125 and a duct 126 in the die 9 with the interior of the tube 72. The outlet of the pump is connected through a chambered member 127, piping 128 and a duct 129 in the die 9 with the nozzle 122. When the pump 124 is in operation, there is a continuous flow of air into the tube 72 through the nozzle 122 and the spray head 121, and then out of the tube 72 through the duct 126. The ducts 126 and 129 are extended through radial webs or spokes 22 in the die structure.

The chambered device 127 comprises a means for adding a coating substance to the circulating stream of air, or other gaseous or vaporous fluid which is fed by the pump 124 into the device 127. The device 127, in one practice of the invention, comprises an insufflator for adding a powder, such as talc, for example, to the air stream, so that this powder will be sprayed out onto the inner surface of the tube 72 as indicated by arrows 130 in Fig. 8. The gaseous pressure within the tube 72 is maintained and controlled by connecting a source of gaseous pressure 131 with some part of the air circulating system, for example, the chambered device 127, through a pressure regulator 132 which operates whenever the pressure in the system drops below a predetermined value to feed additional fluid medium into the air circulating system. A pressure relief valve 134 is connected to the system for bleeding off excess pressure should rise in temperature in the air circulating system cause a pressure increase beyond a predetermined value. A pressure gauge 136 is connected into the system to indicate the existing pressure.

In Fig. 8, I show the first shock cooling member 47, and around this member 47 I have provided an annular tray 138 to hold a liquid, for example water or other lubricant 139. An annular wick 140 is disposed immediately above the shock cooling member 47 so as to engage the external surface of the tube 72. Fingers 141 support this wick 140 so that a portion thereof extends into the liquid 139 in the annular tray 138. The liquid 139 is applied to the lower portion of the wick 140 and by capillary action is carried through the wick 140 to the surface of the tube 72 as such tube 72 moves upwardly. The liquid thus applied to the external surface of the tube 72 acts, in the example of the invention now being described, as a lubricant which enables the tube 72 to slide easily through the opening defined by the conical wall 51. Also, the liquid applied to the outer surface of the tube 72 by the wick 140 may act as a means for preventing the tube 72 from sticking to the conical wall 51.

I claim:

1. In a method of forming a wall from thermoplastic material of the character described: heating the material; continuously forming a sheet of the heated material; moving the sheet continuously along a path of movement; bringing all portions of the sheet consecutively into engagement with a cooled wall surface so as to extract heat therefrom; and stretching the sheet after it has been so cooled so as to produce molecular orientation therein.

2. In a method of forming a wall from thermoplastic materal of the character described: heating the material; continuously forming a sheet of the heated material and moving the sheet forwardly through a path of movement as it is formed; and simultaneously bringing the full width of the sheet into engagement with a cooled wall surface so as to extract heat therefrom, and stretching the sheet so as to produce molecular orientation therein while it is in engagement with said wall.

3. In a method of forming a wall from thermoplastic material of the character described: heating the material; extruding a tube of the heated material; moving the tube forwardly; shock-cooling the wall of the tube; stretching said wall to a selected diameter; and circumferentially restraining further expansion of said tube while cooling the said wall to near its substantially non-plastic state.

4. In a method of forming a wall from thermoplastic material of the character described: heating the material; extruding a tube of the heated material; moving the tube forwardly; stretching the tube and increasing its diameter; flattening the tube at a place spaced from the position at which the tube is extruded, thereby forming a substantially closed air chamber within the tube wherein air pressure may act to expand the tube; forming a continuous closed path for the flow of a gaseous medium, said path including the interior of said tube; circulating a gaseous medium through said path; maintaining said gaseous medium under pressure and adding to said gaseous medium a substance which is to be applied to the inner surface of said tube.

5. In a method of forming a wall from thermoplastic material whic his set at normal temperature: extruding a sheet of the material heated to thermoplastic condition; rapidly cooling the sheet to a temperature between the temperature at which it is extruded and said normal temperature; stretching the sheet; and again rapidly cooling the sheet while at the same time subjecting it to a stretching force, to effect longitudinal molecular orientation therein, to bring the sheet to said normal temperature and to desired dimension.

6. In a method of forming a wall from thermoplastic material which is set at normal temperature: extruding a tubular sheet of the material heated to thermoplastic condition; rapidly cooling the sheet to a temperature between the temperature at which it is extruded and said normal temperature; then stretching the sheet laterally so as to effect lateral molecular orientation therein; and again cooling the sheet while at the same time subjecting it to a longitudinal stretching force, to effect longitudinal molecular orientation therein, to bring the sheet to said normal temperature and to desired dimension.

7. In a method of forming a wall from thermoplastic material which is set at normal temperature: extruding a tubular sheet of the material heated to thermoplastic condition; bring the sheet into contact with the surface of a cooled body so as to rapidly bring the sheet to a temperature between the temperature at which it is extruded and said normal temperature; stretching the sheet principally laterally; restraining the sheet from lateral stretching; stretching the sheet longitudinally; and cooling the sheet to said normal temperature.

8. In a method of forming a wall of thermoplastic material: moving forwardly a tube of thermoplastic material at formative temperature; expanding the tube to increase its diameter; moving the expanded portion of said tube through and in contact with a cooled annular wall; and stretching said tube longitudinally.

9. In a method of forming a wall of thermoplastic material: moving forwardly a tube of thermoplastic material at formative temperature; quickly cooling the tube; expanding the tube to increase ts diameter; moving the expanded portion of said tube through and in contact with a cooled annular wall; stretching said tube longitudinally while controlling its diameter; and cooling the tube to a temperature at which it can be handled without deformation of the tube wall.

RICHARD G. KRESS.

References Cited in the file of this patent

UNITED STATES PATENTS

| Number | Name | Date |
|---|---|---|
| 1,724,354 | Kraft | Aug. 13, 1929 |
| 1,975,121 | Potdevin | Oct. 2, 1934 |
| 2,047,554 | Fischer | July 14, 1936 |
| 2,297,645 | Bailey | Sept. 29, 1942 |
| 2,317,687 | Larchar | Apr. 27, 1943 |
| 2,490,930 | Thompson | Dec. 13, 1944 |
| 2,401,798 | Reichel | June 11, 1946 |
| 2,433,937 | Tornberg | Jan. 6, 1948 |
| 2,461,975 | Fuller | Feb. 15, 1949 |
| 2,461,976 | Schenk | Feb. 15, 1949 |
| 2,499,398 | Lyon | Mar. 7, 1950 |
| 2,529,897 | Bailey et al. | Nov. 14, 1950 |